(12) United States Patent
Tran et al.

(10) Patent No.: US 10,530,448 B1
(45) Date of Patent: Jan. 7, 2020

(54) SWITCHED-BEAM COMMUNICATION NODE

(71) Applicant: Nokia Technologies Oy, Espoo (FI)

(72) Inventors: Cuong Tran, Howell, NJ (US); Robert Fairfield, Randolph, NJ (US); Ajit Reddy, Cliffwood, NJ (US); Dragan Samardzija, Highlands, NJ (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/235,129

(22) Filed: Dec. 28, 2018

(51) Int. Cl.
| | |
|---|---|
| *H01Q 3/26* | (2006.01) |
| *H01Q 3/24* | (2006.01) |
| *H04B 7/04* | (2017.01) |
| *H04B 7/02* | (2018.01) |
| *H04B 7/06* | (2006.01) |

(52) U.S. Cl.
CPC ................................. *H04B 7/0617* (2013.01)

(58) Field of Classification Search
CPC ... H04B 1/18; H04B 1/40; H04B 1/44; H04B 7/02; H04B 7/04; H04B 7/0408; H04B 7/0602; H01Q 3/00; H01Q 3/26; H01Q 3/2605; H01Q 3/30; H01Q 3/36; H01Q 3/40
See application file for complete search history.

(56) References Cited

U.S. PATENT DOCUMENTS 4,231,040 A * 10/1980 Walker ..................... H01Q 3/40
342/373
5,771,017 A * 6/1998 Dean ........................ H01Q 1/246
342/374

(Continued)

FOREIGN PATENT DOCUMENTS

JP 2008196954 A * 8/2008 .............. G04C 9/02
WO WO2018060661 A1 4/2018

OTHER PUBLICATIONS

Fakoukakis, F.E., et al. "Development of an adaptive and a switched beam smart antenna system for wireless communications." Journal of electromagnetic waves and applications 20.3 (2006): 399-408.

(Continued)

*Primary Examiner* — Blane J Jackson
(74) *Attorney, Agent, or Firm* — Steve Mendelsohn; Mendelsohn Dunleavy, P.C.

(57) ABSTRACT

A switched-beam communication node (e.g., transmitter, receiver, or transceiver) has an antenna array, an (N×N) passive multibeamformer (e.g., Butler matrix (BM)), a phase network, a switch network, and a controller. The phase network has N phase shifters, one for each different beam port of the Butler matrix. The controller configures the node to support either (i) any one of N main beampatterns supported by the Butler matrix by controlling the switch network to select one of the phase shifters and its corresponding BM beam port or (ii) any one of up to at least (N−1) combined beampatterns by controlling the switch network to select two of the phase shifters and their two corresponding BM beam ports. Each combined beampattern is a combination of two phase-shifted main beampatterns. In some embodiments, the node can be configured to provide two concurrent beampatterns for transmit and/or receive operations, thereby supporting space-division multiple-access systems.

21 Claims, 11 Drawing Sheets

(56) References Cited

U.S. PATENT DOCUMENTS

| | | | | |
|---|---|---|---|---|
| 6,104,935 A | * | 8/2000 | Smith | H01Q 1/246 |
| | | | | 455/562.1 |
| 6,642,908 B2 | * | 11/2003 | Pleva | B60K 31/0008 |
| | | | | 343/876 |
| 6,728,554 B1 | | 4/2004 | Wegner | |
| 7,183,995 B2 | * | 2/2007 | Pleva | G01S 7/032 |
| | | | | 342/374 |
| 8,412,106 B2 | * | 4/2013 | da Silva | H04B 7/04 |
| | | | | 455/63.4 |
| 2005/0030227 A1 | | 2/2005 | Shamsaifar et al. | |
| 2009/0207077 A1 | * | 8/2009 | Hwang | H01Q 3/40 |
| | | | | 342/374 |
| 2017/0062948 A1 | * | 3/2017 | Artemenko | H01Q 3/245 |
| 2017/0331528 A1 | | 11/2017 | Gamand et al. | |

OTHER PUBLICATIONS

Patterson, C.E., et al. "A 60-GHz active receiving switched-beam antenna array with integrated butler matrix and GaAs amplifiers." IEEE Transactions on Microwave Theory and Techniques 60.11 (2012): 3599-3607.

Chen, C. H., et al. Miniature 2.4-GHz switched beamformer module in IPD and its application to very-low-profile 1D and 2D scanning antenna arrays. In 2017 IEEE 67th Electronic Components and Technology Conference (ECTC) (pp. 273-284).

Hansen, R. C., "Phased Array Antennas: Chapter 10 Multiple-Beam Antennas," Wiley, 1998, pp. 330-380.

\* cited by examiner

| Beam No. | 4L | 4L+3L | 3L | 3L+2L | 2L | 2L+1L | 1L | 1L+1R | 1R | 1R+2R | 2R | 2R+3R | 3R | 3R+4R | 4R |
|---|---|---|---|---|---|---|---|---|---|---|---|---|---|---|---|
| Beam pointing angle | -58° | -48° | -37.5° | -29.5° | -21.5° | -14° | -7° | 0° | 7° | 14° | 21.5° | 29.5° | 37.5° | 48° | 58° |

700

| FEM1 BEAM SELECTION | SWITCH PORTS UTILIZED BY FEM1 | POSSIBLE BEAM OPTIONS FOR FEM2 | POSSIBLE SWITCH PORTS UTILIZED BY FEM2 |
|---|---|---|---|
| 4L+3L | SW2-3 + SW1-3 | 1L+1R<br>1R+2R<br>2R+3R<br>3R+4R | SW3-1 + SW4-4<br>SW4-4 + SW3-4<br>SW3-4 + SW4-2<br>SW4-2 + SW3-2 |
| 3L+2L | SW1-3 + SW2-1 | 1R+2R<br>2R+3R<br>3R+4R | SW4-4 + SW3-4<br>SW3-4 + SW4-2<br>SW4-2 + SW3-2 |
| 2L+1L | SW2-1 + SW1-1 | 2R+3R<br>3R+4R | SW3-4 + SW4-2<br>SW4-2 + SW3-2 |
| 1L+1R | SW1-1 + SW2-4 | 4L+3L<br>3R+4R | SW4-3 + SW3-3<br>SW4-2 + SW3-2 |
| 1R+2R | SW2-4 + SW1-4 | 4L+3L<br>3L+2L | SW4-3 + SW3-3<br>SW3-3 + SW4-1 |
| 2R+3R | SW1-4 + SW2-2 | 4L+3L<br>3L+2L<br>2L+1L | SW4-3 + SW3-3<br>SW3-3 + SW4-1<br>SW4-1 + SW3-1 |
| 3R+4R | SW2-2 + SW1-2 | 4L+3L<br>3L+2L<br>2L+1L<br>1L+1R | SW4-3 + SW3-3<br>SW3-3 + SW4-1<br>SW4-1 + SW3-1<br>SW3-1 + SW4-4 |

FIG. 8

SWITCHED-BEAM COMMUNICATION NODE

BACKGROUND

Field of the Invention

Various example embodiments relate to switched-beam transmitters, receivers, and transceivers (collectively referred to herein as communication nodes) for communication systems.

Description of the Related Art

This section introduces aspects that may help facilitate a better understanding of the invention. Accordingly, the statements of this section are to be read in this light and are not to be understood as admissions about what is prior art or what is not prior art.

FIG. 1 is a schematic block diagram of a switched-beam transceiver 100 that is capable of supporting eight different beampatterns. As shown in FIG. 1, the transceiver 100 has a radio baseband unit (RBU) 111, a front-end module (FEM) 115, a 1:8 switch network 120, an (8×8) Butler matrix 140, and eight 8-element feed networks 180. Although not represented as such in FIG. 1, the antenna elements within the eight feed networks 180 are physically positioned horizontally half a wavelength apart to form the eight antenna columns of an (8×8) antenna array.

The switch network 120 has a common port 121 connected to the FEM 115 and eight switched ports 122. The Butler matrix 140 has (i) eight antenna ports 142, labeled $A_1$-$A_8$, where each antenna port 142 is connected to a different feed network 180, and (ii) eight beam ports 141, labeled 1L-4L and 1R-4R, where each beam port 141 is connected to a different switched port 122 of the switch network 120. The FEM 115 is connected between the common port 121 of the switch network 120 and the RBU 111.

In operation, the RBU 111 provides (i) an FEM-control signal 112 to control the operations of the FEM 115 and (ii) a switch-control signal 113 to control the switch network 120 to connect its common port 121 to one and only one of its eight switched ports 122.

When operated in the transceiver's transmit (Tx) mode, the RBU 111 transmits a digital baseband Tx signal 114 to the FEM 115, which converts the baseband signal Tx 114 into an analog RF Tx signal 116, which is transmitted to the switch network 120. Based on the switch-control signal 113 received from the RBU 111, the switch network 120 routes the Tx signal 116 as Tx signal 123 to one and only one of the eight beam ports 141 of the Butler matrix 140, which phase-shifts, routes, and transmits the Tx signal 123 as eight differently phase-shifted Tx signals 143 from the Butler matrix's eight antenna ports 142 to the eight feed networks 180, which wirelessly transmit the eight phase-shifted Tx signals 143 in a particular beampattern. Those skilled in the art will understand that each different beam port 141 of the Butler matrix 140 corresponds to a different beampattern such that Tx signals can be sequentially transmitted in different ones of the eight different beampatterns supported by the Butler matrix 140 by changing the switch network 120 to route the Tx signal 116 as the Tx signal 123 to a different beam port 141.

When operated in the transceiver's receive (Rx) mode, the Butler matrix 140 receives eight analog RF Rx signals 143 from the eight feed networks 180 at the eight antenna ports 142 of the Butler matrix 140. The Butler matrix 140 phase shifts, routes, combines, and transmits those eight Rx signals 143 as eight combined Rx signals 123 from the Butler matrix's eight beam ports 141 to the eight switched ports 122 of the switch network 120. Based on the switch-control signal 113 received from the RBU 111, the switch network 120 is configured to route and transmit one and only one of the those eight combined Rx signals 123 as an Rx signal 116 to the FEM 115, which converts and transmits that Rx signal 116 as a digital baseband Rx signal 114 to the RBU 111, which performs suitable signal processing on that Rx signal 114. Those skilled in the art will understand that the transceiver 100 can be sequentially configured to operate in the receive mode with different ones of the eight different beampatterns supported by the Butler matrix 140 by changing the switch network 120 to route and transmit a different one of the eight combined Rx signals 123 as the Rx signal 116 to the FEM 115.

As described, the transceiver 100 of FIG. 1 can be operated with only one of the eight different beampatterns supported by the (8×8) Butler matrix 140 at a time. More beampatterns can be supported using the architecture of transceiver 100 by increasing the sizes of the Butler matrix 140 and the switch network 120. For example, 16 different beampatterns can be supported by (i) replacing the (8×8) Butler matrix 140 with a suitable (16×16) Butler matrix and (ii) replacing the 1:8 switch network 120 with a suitable 1:16 switch network. Even so, that augmented transceiver can still be operated in only one of those 16 different beampatterns at a time.

SUMMARY

Disclosed herein are various embodiments of switched-beam communication nodes, such as transmitters, receivers, and transceivers, for communication systems. In some embodiments, in addition to an antenna array and a controller (e.g., having an RBU and an FEM), the communication node has an (N×N) Butler matrix, a fixed phase network having N fixed phase shifters connected to the N beam ports of the Butler matrix, and a switch network, where the switch network can be configured to enable the communication node to operate with any one of the N different main beampatterns supported by the Butler matrix or with any one of (N−1) different combined beampatterns. A main beampattern is selected by configuring the switch network to connect the controller to one of the phase shifters in the phase network, while a combined beampattern is selected by configuring the switch network to connect the controller to an appropriate pair of phase shifters in the phase network, where each phase shifter is configured to apply a particular phase shift selected to enable the Butler matrix to support the (N−1) combined beampatterns.

In some embodiments, the communication node can be configured to operate concurrently with two different beampatterns.

In some transceiver embodiments, a single Butler matrix, a single phase network, and a single switch network can be time-multiplexed to support both transmit and receive operations.

BRIEF DESCRIPTION OF THE DRAWINGS

Embodiments of the invention will become more fully apparent from the following detailed description, the appended claims, and the accompanying drawings in which like reference numerals identify similar or identical elements.

FIG. 8 is a table that identifies (i) different pairs of combined beampatterns that can be concurrently supported by the transmitter of FIG. 6 and the receiver of FIG. 7 and (ii) the switch ports that can be used to provide those beampatterns, according to certain embodiments of the invention;

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components.

Figure 2:
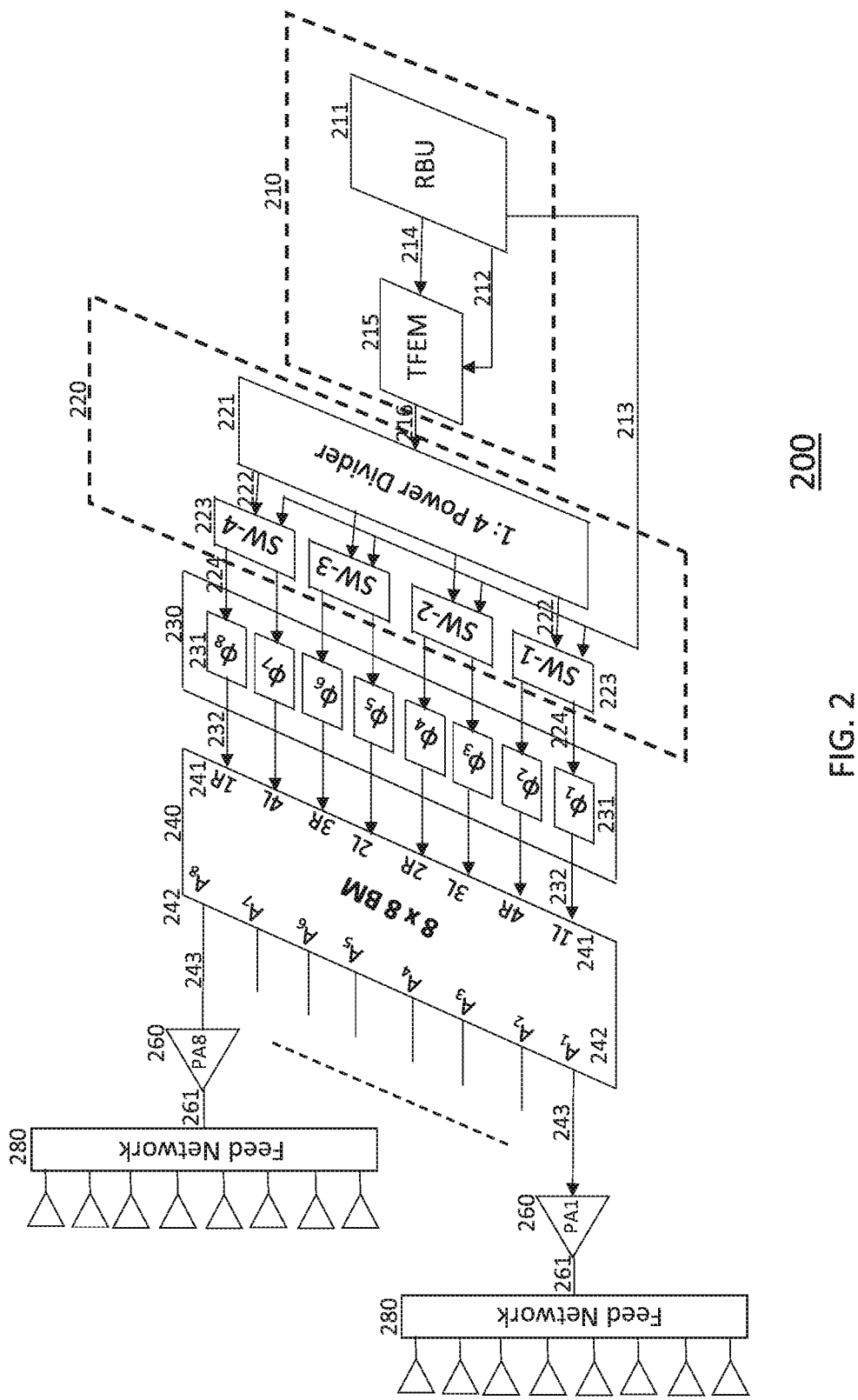
FIG. 2 is a schematic block diagram of an example of a switched-beam transmitter of the present disclosure.

FIG. 2 is a schematic block diagram of an example of a switched-beam transmitter 200 of the present disclosure that is capable of supporting eight different main beampatterns and seven different combined beampatterns. As shown in FIG. 2, transmitter 200 has a controller 210, a switch network 220, a fixed phase network 230, an (8×8) Butler matrix 240, eight power amplifiers (PAs) 260, and eight 8-element feed networks 280. Although not represented as such in FIG. 2, the antenna elements within the eight feed networks 280 are physically positioned horizontally half a wavelength apart to form the eight antenna columns of an (8×8) antenna array.

Figure 1:
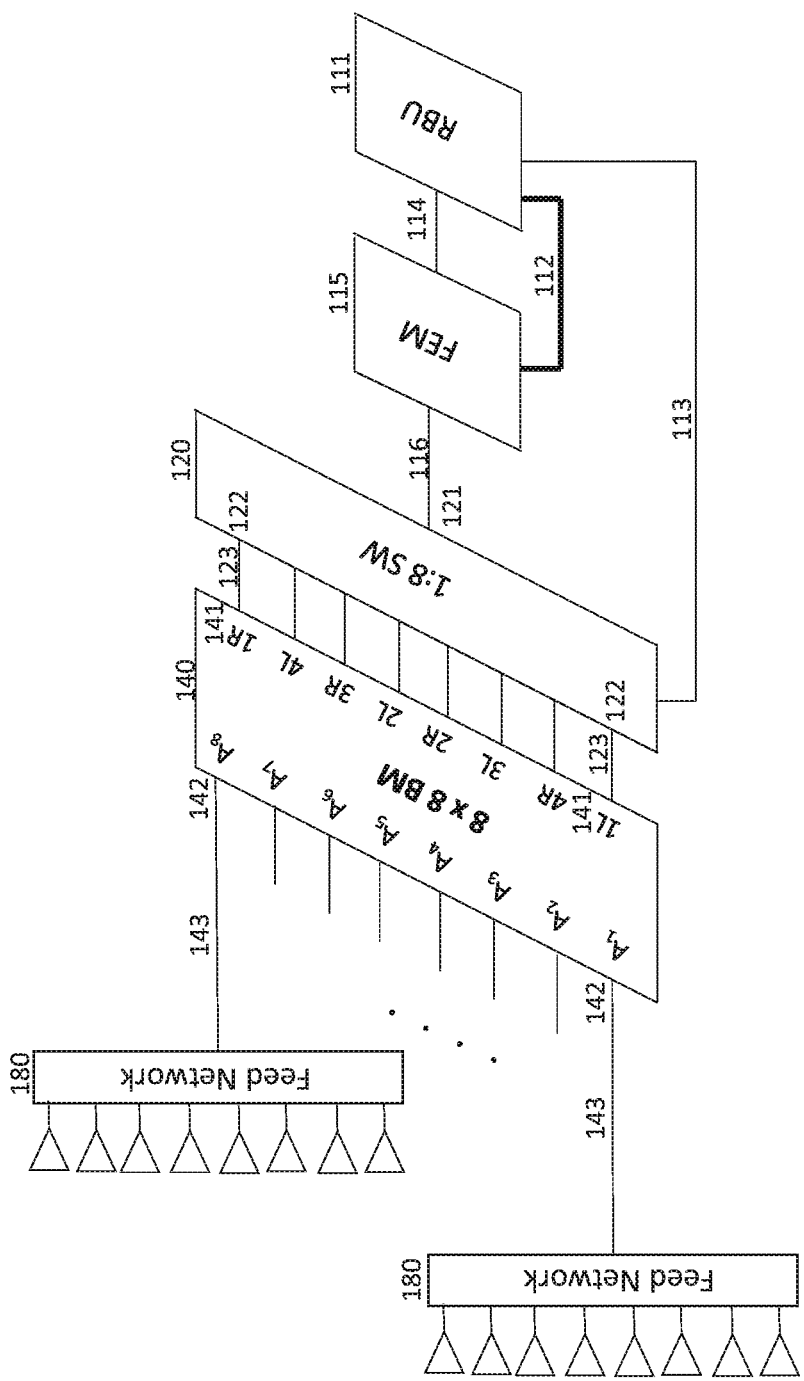
FIG. 1 is a schematic block diagram of a switched-beam transceiver.

As shown in FIG. 2, the controller 210 includes a radio baseband unit (RBU) 211 and a transmitter front-end module (TFEM) 215, and the switch network 220 includes a 1:4 power divider 221 and four 1:2 switches 223, labeled SW-1 to SW-4. The fixed phase network 230 includes eight fixed phase shifters 231 that apply eight (possibly but not necessarily different) fixed phase shifts $\phi_1$-$\phi_8$. The Butler matrix 240 can be (but does not have to be) identical to the Butler matrix 140 of FIG. 1, and the eight feed networks 280 can be (but do not have to be) identical to the eight feed networks 180 of FIG. 1.

In operation, the RBU 211 provides (i) a TFEM-control signal 212 to control the operations of the TFEM 215 and (ii) a switch-control signal 213 to control the switch network 220 to connect the TFEM 215 (via the power divider 221 and the switches 223) to one or two of the eight phase shifters 231 of the phase network 230. In particular, if the transmitter 200 is configured to operate with one of the eight main beampatterns, then the switch-control signal 213 disables three of the switches 223 and configures the remaining switch 223 to connect the power divider 221 to one of its two corresponding phase shifters 231 in the phase network 230. On the other hand, if the transmitter 200 is configured to operate with one of the seven combined beampatterns, then the switch-control signal 213 disables two of the switches 223 and configures each of the two remaining switches 223 to connect the power divider 221 to one of its two corresponding phase shifters 231. Note that the switches 223 are properly terminated when disabled. It should also be noted that each unused port on any active switch 223 is also properly terminated.

The RBU 211 transmits a digital baseband Tx signal 214 to the TFEM 215, which converts the digital baseband Tx signal 214 into an analog RF Tx signal 216. The TFEM 215 may include the components of a transmitter front-end module needed to convert the digital baseband Tx signal 214 into the analog RF Tx signal 216, such as, but not limited to, a digital-to-analog converter (DAC) configured to convert from digital to analog, a mixer configured to upconvert from baseband to RF, a synthesizer, a filter, and an attenuator.

The TFEM 215 transmits the Tx signal 216 to the power divider 221, which divides the Tx signal 216 into four Tx signals 222 that are applied to the four switches 223. Depending on whether the transmitter 200 is configured to operate with a main beampattern or a combined beampattern, the switches 223 route one or two of the Tx signals 222 as one or two Tx signals 224 to one or two of the phase shifters 231 of the phase network 230, which phase shift and transmit those one or two Tx signals 224 as one or two phase-shifted Tx signals 232 to one or two of the beam ports 241 of the Butler matrix 240, which phase-shifts, routes, and transmits those one or two phase-shifted Tx signals 232 from the Butler matrix's eight antenna ports 242 as eight different Tx signals 243 to the eight PAs 260, which amplify and apply their corresponding Tx signals 243 as eight amplified Tx signals 261 to the eight feed networks 280, which wirelessly transmit the amplified Tx signals 261 in a corresponding one of the 15 different beampatterns supported by the transmitter 200.

Those skilled in the art will understand that different ones of the 15 beampatterns can be sequentially selected by changing the switch network 220 to route the Tx signal 216 to a different set of one or two phase shifters 231 in the phase network 230.

Figure 3:
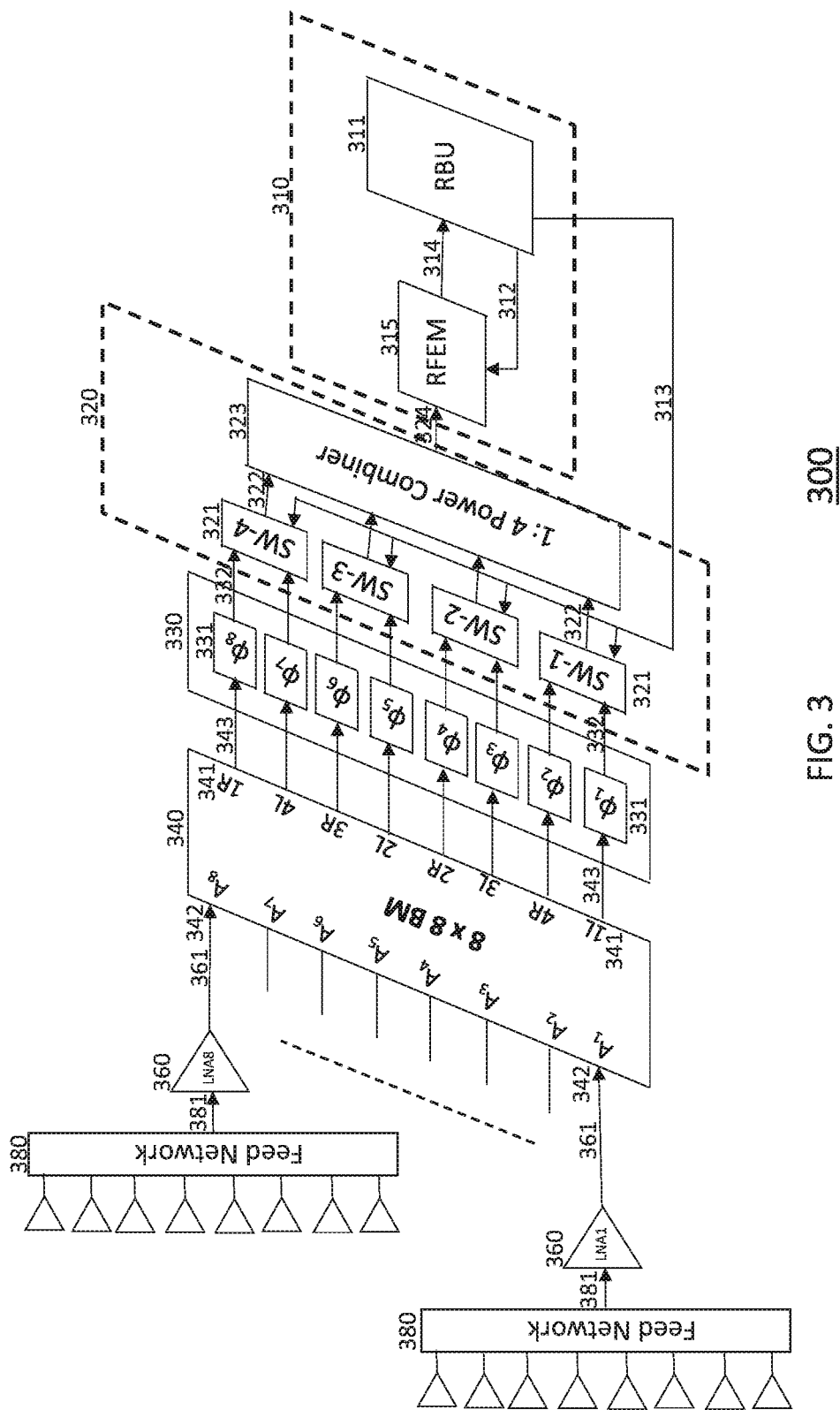
FIG. 3 is a schematic block diagram of an example of a switched-beam receiver of the present disclosure.

FIG. 3 is a schematic block diagram of a switched-beam receiver 300 of the present disclosure that is capable of supporting eight different main beampatterns and seven different combined beampatterns. As shown in FIG. 3, receiver 300 has a controller 310, a switch network 320, a fixed phase network 330, an (8×8) Butler matrix 340, eight low-noise amplifiers (LNAs) 360, and eight 8-element feed networks 380. Although not represented as such in FIG. 3, the antenna elements within the eight feed networks 380 are physically positioned horizontally half a wavelength apart to form the eight antenna columns of an (8×8) antenna array.

As shown in FIG. 3, the controller 310 includes an RBU 311 and a receiver FEM (RFEM) 315, and the switch network 320 includes four 1:2 switches 321 and a 1:4 power combiner 323. The fixed phase network 330 includes eight fixed phase shifters 331 that apply eight (possibly different) fixed phase shifts $\emptyset_1$-$\emptyset_8$. The switch network 320 can be (but does not have to be) identical to the switch network 220 of FIG. 2, the fixed phase network 330 can be (but does not have to be) identical to the fixed phase network 230 of FIG. 2, the Butler matrix 340 can be (but does not have to be) identical to the Butler matrix 240 of FIG. 2, and the eight feed networks 380 can be (but do not have to be) identical to the eight feed networks 280 of FIG. 2.

In operation, the RBU 311 provides (i) an RFEM-control signal 312 to control the operations of the RFEM 315 and (ii) a switch-control signal 313 to control the switch network 320 to connect one or two of the eight phase shifters 331 of the phase network 330 (via the switches 321 and the power combiner 323) to the RFEM 315. In particular, if the receiver 300 is configured to operate with one of the eight main beampatterns, then the switch-control signal 313 disables three of the switches 321 and configures the remaining switch 321 to connect one of its two corresponding phase shifters 331 in the phase network 330 to the power combiner 323. On the other hand, if the receiver 300 is configured to operate with one of the seven combined beampatterns, then the switch-control signal 313 disables two of the switches 321 and configures each of the two remaining switches 321 to connect one of its two corresponding phase shifters 331 to the power combiner 323. Note that the switches 321 are properly terminated when disabled. It should also be noted that each unused port on any active switch 321 is also properly terminated.

The eight LNAs 360 receive and amplify eight analog RF Rx signals 381 from the eight feed networks 380 and transmit the eight resulting amplified Rx signals 361 to the eight antenna ports 342 of the Butler matrix 340, which phase-shifts, routes, combines, and transmits those eight Rx signals 361 as eight different Rx signals 343 from the Butler matrix's eight beam ports 341 to the eight phase shifters 331 in the phase network 330. The eight resulting phase-shifted Rx signals 332 are transmitted to the four switches 321.

Depending on whether the receiver 300 is configured to operate with a main beampattern or a combined beampattern, the switches 321 route one or two of the Rx signals 332 as one or two Rx signals 322 to the power combiner 323. If the power combiner 323 receives one Rx signal 322, then the power combiner 323 transmits that Rx signal 322 as the Rx signal 324 to the RFEM 315. If the power combiner 323 receives two Rx signals 322, then the power combiner 323 combines those two Rx signals 322 and transmits the resulting combined signal as the Rx signal 324 to the RFEM 315.

The RFEM 315 converts the Rx signal 324 into a digital baseband Rx signal 314 and transmits the Rx signal 314 to the RBU 311, which performs appropriate signal processing on that Rx signal 314. The RFEM 315 may include the components of a receiver front-end module needed to convert the analog RF Rx signal 324 into the digital baseband Rx signal 314, such as, but not limited to, a mixer configured to down convert from RF to baseband, an analog-to-digital converter (ADC) configured to convert from analog to digital, a synthesizer, a filter, a programmable gain amplifier (PGA), and an attenuator.

Those skilled in the art will understand that different ones of the 15 beampatterns can be sequentially selected by changing the switch network 320 to route a different set of one or two of the Rx signals 332 to the power combiner 323.

Figures 4, 5A, 5B:
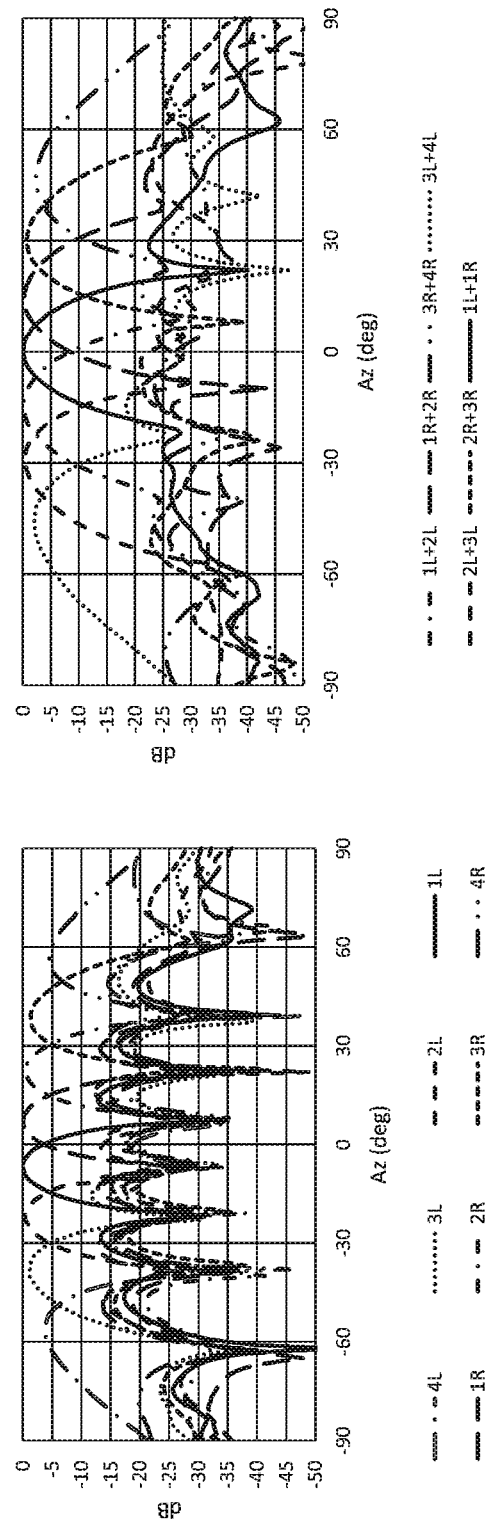
FIG. 4 is a table that identifies the azimuth angles of the 15 different beampatterns that are supported by the transmitter 200 of FIG. 2 and by the receiver 300 of FIG. 3, according to certain embodiments of the disclosure.
FIG. 5A presents graphical representations of the eight main beampatterns of FIG. 4.
FIG. 5B presents graphical representations of the seven combined beampatterns of FIG. 4.

FIG. 4 is a table that identifies the azimuth angles (for an antenna array oriented with vertical feed networks 280/380) of the 15 different beampatterns that are supported by the transmitter 200 of FIG. 2 and by the receiver 300 of FIG. 3, according to certain embodiments of the invention. In particular, the eight beampatterns identified by the labels 1L-4L and 1R-4R correspond to the eight main beampatterns that are achieved by selecting only one beam port of the Butler matrix. The other seven beampatterns identified in FIG. 4 correspond to the seven combined beampatterns that are achieved by selecting an appropriate pair of beam ports of the Butler matrix.

For example, the combined beampattern (4L+3L) in FIG. 4 is achieved by selecting beam ports 4L and 3L of the Butler matrix, which correspond to the two phase shifters 231/331 in the phase network 230/330 having phase shifts of $\emptyset_7$ and $\emptyset_3$, respectively. The combined beampattern (4L+3L) corresponds generally to a combination of the two main beampatterns 4L and 3L, where the two phase shifts $\emptyset_7$ and $\emptyset_3$ are selected to reduce the magnitudes of the side-lobes of the combined beampattern (4L+3L) in order to improve the orthogonality between different beampatterns. Note that, to achieve the combined beampattern (4L+3L), the switch network 220/320 is configured (i) to disable the two switches 223/321 labeled SW-1 and SW3, (ii) to configure the switch labeled SW-2 to select the phase shifter 231/331 having the phase shift of $\emptyset_3$, and (iii) to configure the switch labeled SW-4 to select the phase shifter 231/331 having the phase shift of $\emptyset_7$. The six other combined beampatterns identified in FIG. 4 are achieved in an analogous manner.

FIG. 5A presents graphical representations of the eight main beampatterns of FIG. 4, and FIG. 5B presents graphical representations of the seven combined beampatterns of FIG. 4, where each graphical representation plots normalized power (in dB) as a function of the azimuth angle (in degrees from normal). The plots demonstrate that, in general, the side-lobes of the combined beampatterns in FIG. 5B are significantly smaller than the side-lobes of the main beampatterns in FIG. 5A, thereby providing even greater orthogonality between the different combined beampatterns than between the different main beampatterns. That improved orthogonality can be exploited in communication nodes that are configured to support two (or more) concurrent beampatterns, which can be utilized in space-division multiple-access (SDMA) systems.

Figure 6:
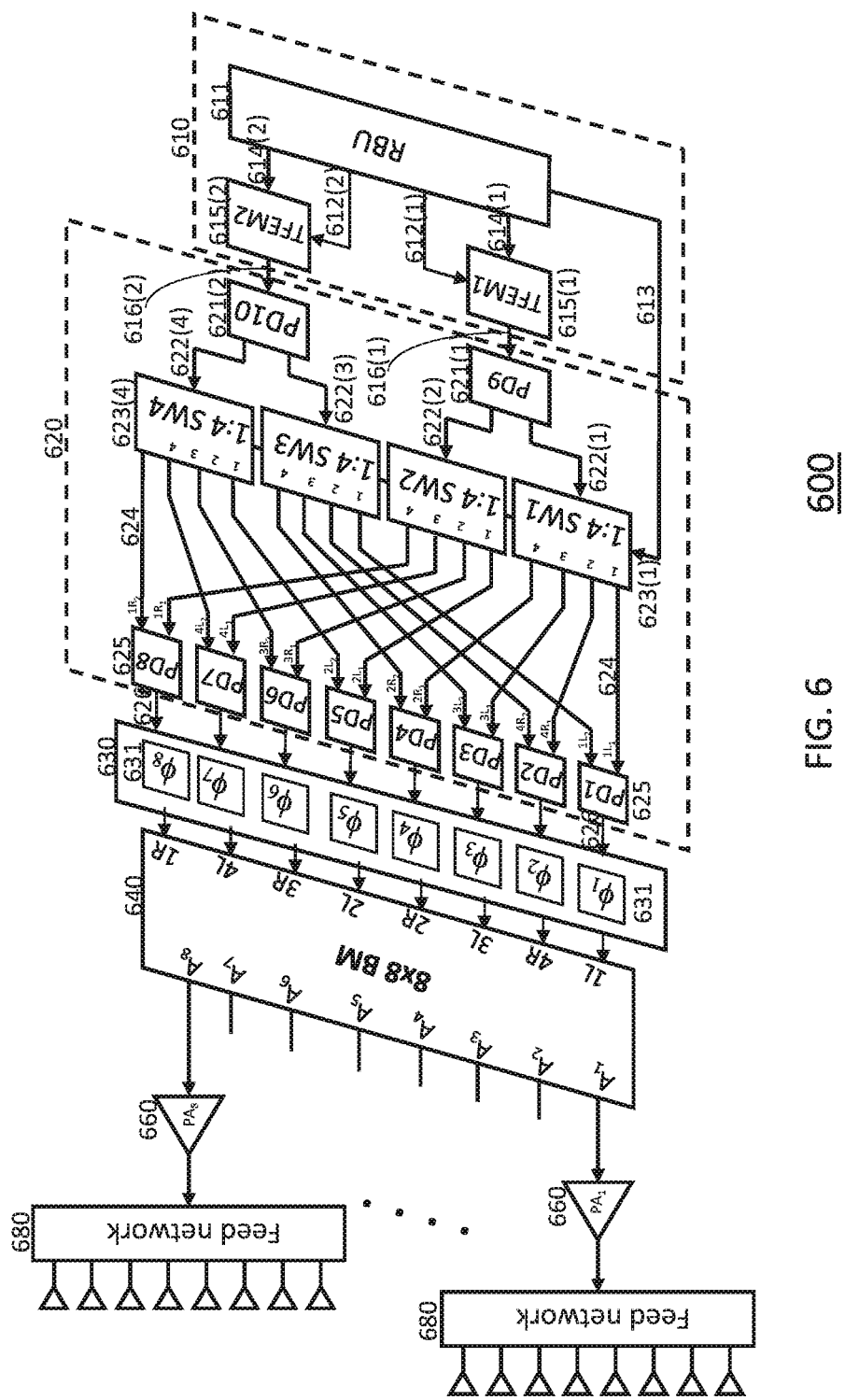
FIG. 6 is a schematic block diagram of an example of a switched-beam transmitter of the present disclosure that is capable of supporting two concurrent beampatterns.

FIG. 6 is a schematic block diagram of an example of a switched-beam transmitter 600 of the present disclosure that is capable of supporting two concurrent beampatterns. Like the transmitter 200 of FIG. 2, the transmitter 600 has a controller 610, a switch network 620, a fixed phase network 630, an (8×8) Butler matrix 640, eight power amplifiers (PAs) 660, and eight 8-element feed networks 680, where the phase network 630, the Butler matrix 640, the PAs 660, and the feed networks 680 can be (but do not have to be) identical to the corresponding elements in the transmitter

200. Note that, although the transmitter 600 can support two concurrent beampatterns, the transmitter 600 may optionally be operated with only a single beampattern.

As shown in FIG. 6, the controller 610 has an RBU 611 and two TFEMs 615(1) and 615(2), one for each of the two concurrent beampatterns, where the controller 610 provides two TFEM-control signals 612(1) and 612(2) to control the operations of the two TFEMs. The switch network 620 has two 1:2 power dividers 621(1) and 621(2), four 1:4 switches 623(1)-623(4), and eight 1:2 power combiners 625. As explained further below, the RBU 611 provides a switch-control signal 613 to configure the four switches 623 to support the two concurrent beampatterns.

In operation, for the first beampattern, the RBU 611 provides a first digital baseband Tx signal 614(1) to the first TFEM 615(1), which converts the first Tx signal 614(1) into a first analog RF Tx signal 616(1). The first power divider 621(1) divides the first Tx signal 616(1) into two Tx signals 622(1) and 622(2), which are respectively switched by the first and second switches 623(1) and 623(2).

At the same time, for the second beampattern, the RBU 611 provides a second digital baseband Tx signal 614(2) to the second TFEM 615(2), which converts the second Tx signal 614(2) into a second analog RF Tx signal 616(2). The second power divider 621(2) divides the second Tx signal 616(2) into two Tx signals 622(3) and 622(4), which are respectively switched by the third and fourth switches 623(3) and 623(4).

The configuration of the switches 623 will determine whether each of the power combiners 625 receives one or zero Tx signals 624 from the switches 623. If a power combiner 625 receives one Tx signal 624, then that power combiner 625 transmits that Tx signal 624 as a Tx signal 626 to the corresponding phase shifter 631 in the phase network 630. If a power combiner 625 receives no Tx signals 624, then that power combiner 625 transmits no Tx signal 626 to the corresponding phase shifter 631 in the phase network 630. Note that all of the inactive ports on any of the switches 623 need to be properly terminated.

The phase network 630, the Butler matrix 640, the PAs 660, and the feed networks 680 all operate similar to the corresponding elements in the transmitter 200 of FIG. 2, except that, in this case, the antenna array will concurrently transmit one set of data (corresponding to the first TX signal 614(1)) in one beampattern and another set of data (corresponding to the second TX signal 614(2)) in another beampattern, thereby achieving space-division multiple-access transmission.

Figure 7:
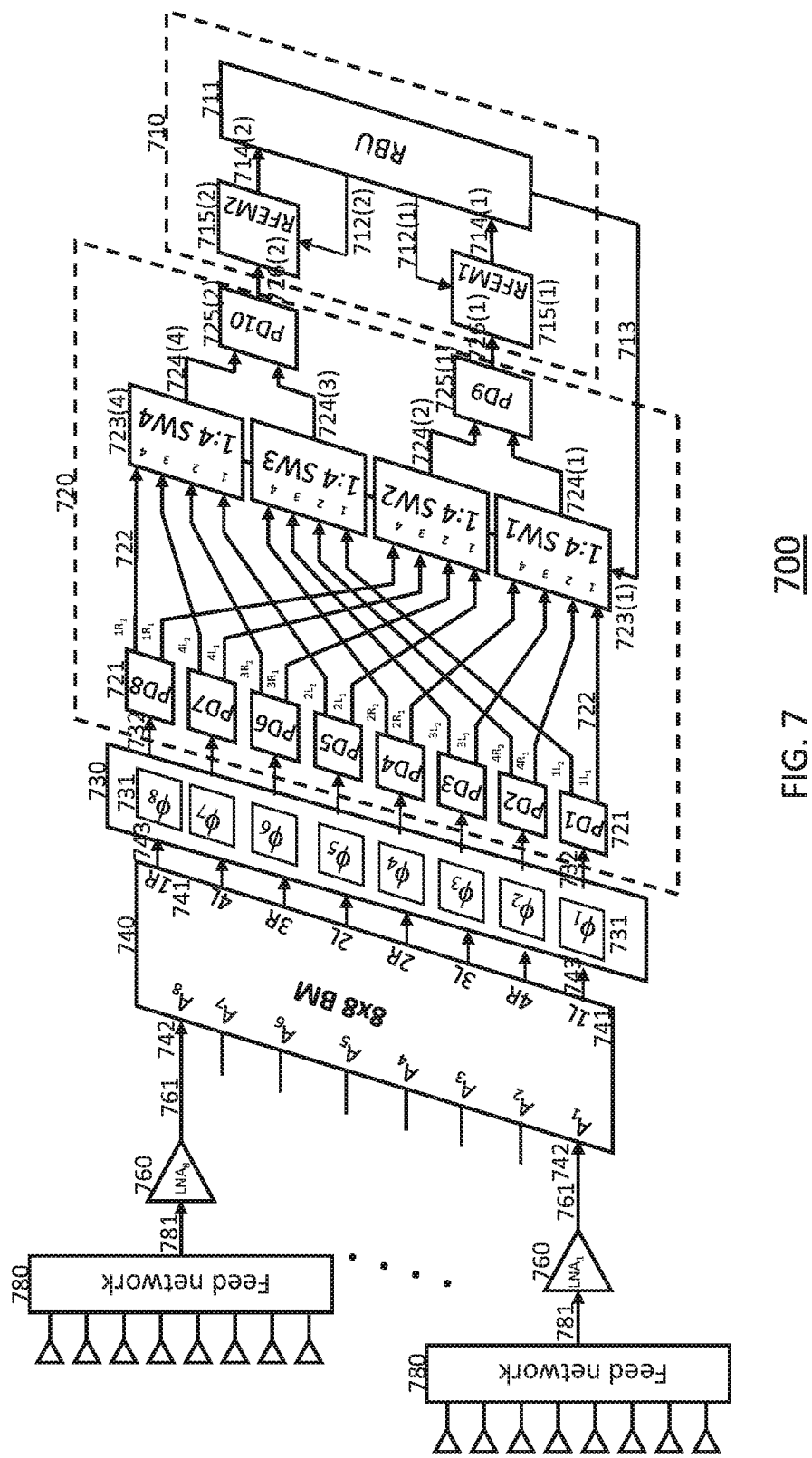
FIG. 7 is a schematic block diagram of an example of a switched-beam receiver of the present disclosure that is capable of supporting two concurrent beampatterns.

FIG. 7 is a schematic block diagram of an example of a switched-beam receiver 700 of the present disclosure that is capable of supporting two concurrent beampatterns. Like the receiver 300 of FIG. 3, the receiver 700 has a controller 710, a switch network 720, a fixed phase network 730, an (8×8) Butler matrix 740, eight LNAs 760, and eight 8-element feed networks 780, where the phase network 730, the Butler matrix 740, the LNAs 760, and the feed networks 780 can be (but do not have to be) identical to the corresponding elements in the receiver 300. Note that, although the receiver 700 can support two concurrent beampatterns, the receiver 700 may optionally be operated with only a single beampattern.

As shown in FIG. 7, the controller 710 has an RBU 711 and two RFEMs 715(1) and 715(2), one for each different beampattern, where the controller provides two RFEM-control signals 712(1) and 712(2) to control the operations of the two RFEMs. The switch network 720 has eight 1:2 power dividers 721, four 1:4 switches 723(1)-723(4), and two 1:2 power combiners 725(1) and 725(2). As explained further below, the controller 710 provides a switch-control signal 713 to configure the four switches 723 to support the two concurrent beampatterns.

In operation, the eight LNAs 760 receive eight analog RF Rx signals 781 from the eight feed networks 780 and transmit eight amplified Rx signals 761 to the eight antenna ports 742 of the Butler matrix 740, which transmits eight Rx signals 743 from its eight beam ports 741 to the eight phase shifters 731 in the phase network 730, where each Rx signal 743 corresponds to a different one of the eight main beampatterns. The phase shifters 731 apply phase shifts to those eight Rx signals 743 to provide eight phase-shifted Rx signals 732 to the eight power dividers 721, which divide the Rx signals 732 and distribute them as the Rx signals 722 to the four switches 723, which are configured to route the Rx signals 722 according to the two concurrent beampatterns.

If the first beampattern is a main beampattern, then one of the switches 723(1) and 723(2) will route a single Rx signal 722 corresponding to that main beampattern as either Rx signal 724(1) or 724(2) to the first power combiner 725(1), which will transmit that Rx signal 724 as a first Rx signal 726(1) to the first RFEM 715(1). If, however, the first beampattern is a combined beampattern, then the switch 723(1) will route one of its four Rx signals 722 corresponding to that combined beampattern as Rx signal 724(1) to the first power combiner 725(1) and the switch 723(2) will route one of its four Rx signals 722 corresponding to that combined beampattern as Rx signal 724(2) to the first power combiner 725(1), which will combine the two Rx signals 724(1) and 724(2) and transmit the resulting combined Rx signal as the first Rx signal 726(1) to the first RFEM 715(1). Note that all the unused ports on any of switches 723 will be properly terminated.

Similarly, if the second beampattern is a main beampattern, then one of the switches 723(3) and 723(4) will route a single Rx signal 722 corresponding to that main beampattern as either Rx signal 724(3) or 724(4) to the second power combiner 725(2), which will transmit that Rx signal 724 as a second Rx signal 726(2) to the second RFEM 715(2). If, however, the second beampattern is a combined beampattern, then the switch 723(3) will route one of its four Rx signals 722 corresponding to that combined beampattern as Rx signal 724(3) to the second power combiner 725(2) and the switch 723(4) will route one of its four Rx signals 722 corresponding to that combined beampattern as Rx signal 724(4) to the second power combiner 725(2), which will combine the two Rx signals 724(3) and 724(4) and transmit the resulting combined Rx signal as the second Rx signal 726(2) to the second RFEM 715(2). Note that all the unused ports on any of switches 723 will be properly terminated.

In any case, the RFEMs 715(1) and 715(2) will convert the Rx signals 726(1) and 726(2) into digital baseband Rx signals 714(1) and 714(2), respectively, for further processing by the RBU 711.

The feed networks 780, the LNAs 760, the Butler matrix 740, and the phase network 730 all operate similar to the corresponding elements in the receiver 300 of FIG. 3, except that, in this case, the antenna array will concurrently receive wireless signals from two different directions corresponding to the two different concurrent beampatterns, thereby achieving space-division multiple-access reception.

FIG. 8 is a table that identifies (i) different pairs of combined beampatterns that can be concurrently supported by the transmitter 600 of FIG. 6 and the receiver 700 of FIG. 7 and (ii) the switch ports that can be used to provide those beampatterns, according to certain embodiments of the invention. For example, according to the first table entry, the combined beampattern (4L+3L) can be provided using port 3 of switch SW2 in FIGS. 6 and 7 and port 3 of switch SW1. The transmitter 600 and the receiver 700 can be configured to support this combined beampattern concurrently with one of (at least) the four combined beampatterns listed in the third column of the table, the first of which is the combined beampattern (1L+1R), which can be provided using port 1 of switch SW3 in FIGS. 6 and 7 and port 4 of switch SW4.

According to FIG. 8, the combined beampattern (4L+3L) can be provided using either (i) port 3 of switch SW2 and port 3 of switch SW1 or (ii) port 3 of switch SW4 and port 3 of switch SW3. As shown in FIGS. 6 and 7, these pairs of switches provide two different ways of accessing the same pair of phase shifters 631/731 having the phase shifts of $ø_7$ and $ø_3$ that are used to provide the combined beampattern (4L+3L).

The different pairs of beampatterns in FIG. 8 correspond to pairs of beampatterns that can be concurrently provided using the particular design of the switch networks 620 and 720 in FIGS. 6 and 7. Other designs of suitable switch networks may be able to support different pairs of concurrent beampatterns. The pairs of beampatterns in FIG. 8 also correspond to pairs of beampatterns that are substantially mutually orthogonal. The switch networks 620 and 720 can support other pairs of concurrent beampatterns, but they might not be sufficiently orthogonal to support concurrent operations.

FIG. 8 identifies only pairs of combined beampatterns that can be supported concurrently by the transmitter 600 and the receiver 700. In addition, the transmitter 600 and the receiver 700 can also support concurrent pairs of beampatterns that include (i) two main beampatterns or (ii) one main beampattern and one combined beampattern, although those pairs might not be sufficiently orthogonal to support concurrent operations.

Figure 9:
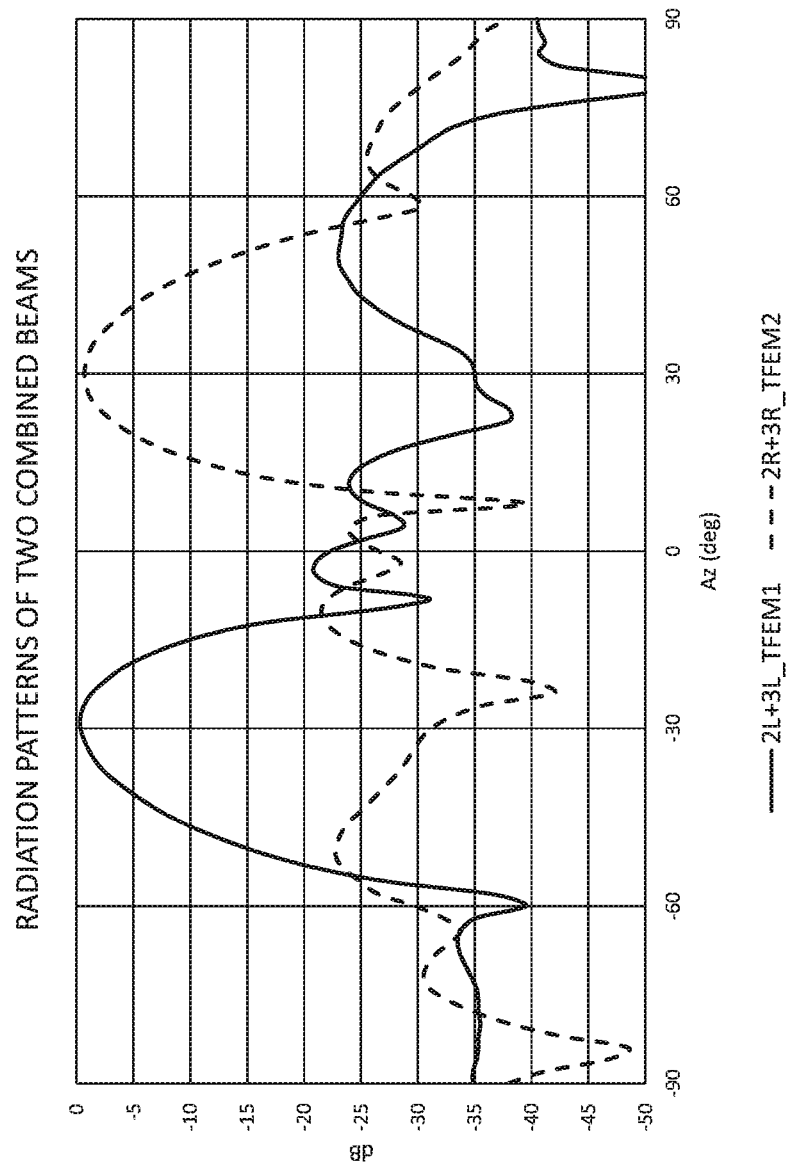
FIG. 9 presents graphical representations an example of two combined beampatterns.

FIG. 9 presents graphical representations of the two combined beampatterns (3L+2L) and (2R+3R). Because the side-lobes of each beampattern are so low at the main lobe of the other beampattern, these two beampatterns are suitable for use as concurrent beampatterns in the transmitter 600 and the receiver 700.

Although FIGS. 6-9 refer to communication nodes that can concurrently support two different beampatterns, those skilled in the art will understand that, in theory, these techniques can be extended to concurrently support three or more different beampatterns.

Figure 10:
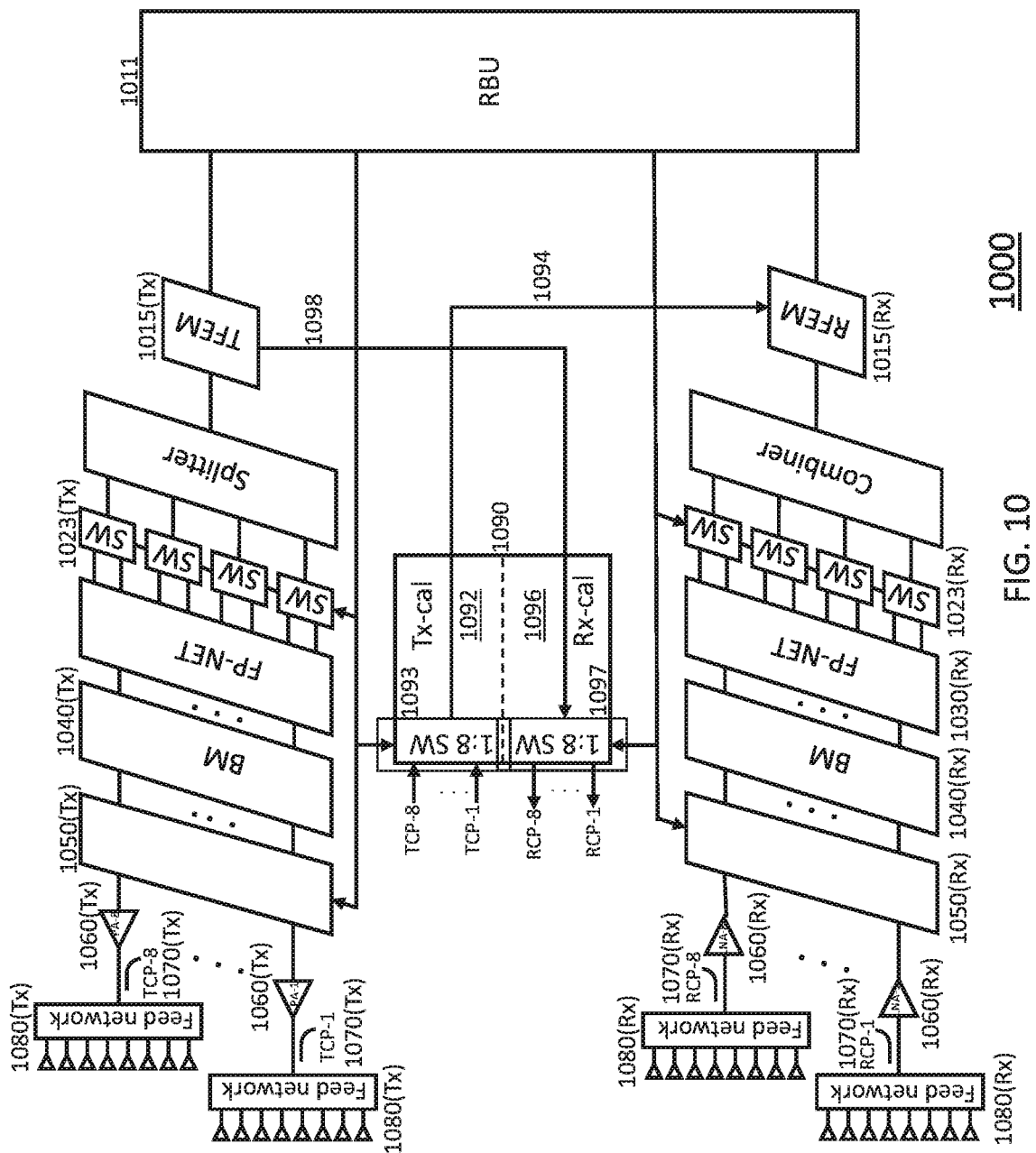
FIG. 10 is a schematic block diagram of an example of a transceiver of the present disclosure.

FIG. 10 is a schematic block diagram of a transceiver 1000 of the present disclosure that supports both transmit and receive operations. The transceiver 1000 is substantially a combination of the transmitter 200 of FIG. 2 (at the top of FIG. 10) and the receiver 300 of FIG. 3 (at the bottom of FIG. 10) with the following differences:

- A single RBU 1011 handles both transmit and receive operations;
- The transmit path includes a controllable transmit phase network 1050(Tx) having eight individually controllable phase shifters connected between the output ports of the transmit Butler matrix 1040(Tx) and the power amplifiers 1060(Tx);
- The receive path includes a controllable receive phase network 1050(Rx) having eight individually controllable phase shifters connected between the LNAs 1060(Rx) and the input ports of the receive Butler matrix 1040(Rx); and
- The transceiver 1000 includes a calibration unit 1090;
- There is a transmit coupler 1070(Tx) between each PA 1060(Tx) and the corresponding transmit feed network 1080(Tx); and
- There is a receive coupler 1070(Rx) between each receive feed network 1080(Rx) and the corresponding LNA 1060(Rx).

In an ideal implementation, the eight PAs 260 in the transmitter 200 of FIG. 2 provide identical gains and identical phase shifts. Similarly, in an ideal implementation, the eight LNAs 360 in the receiver 300 of FIG. 3 also provide identical gains and identical phase shifts. In real-world implementations, however, the gains and phase shifts provided by the PAs 260 will vary from PA to PA and over time. Similarly, in real-world implementations, the gains and phase shifts provided by the LNAs 360 will vary from LNA to LNA and over time. Nevertheless, for some real-world applications of the transmitter 200 and the receiver 300, the gains and phase shifts of those components will be sufficiently similar to meet system requirements.

For other real-world applications, however, the phase shifts applied by those components will be sufficiently different to threaten the ability of the communication node to meet its system requirements. For those applications, the controllable transmit and receive phase networks 1050(Tx) and 1050(Rx) of FIG. 10 can be employed to enable the overall phase shifts provided by (i) the transmit phase network 1050(Tx) and the PAs 1060(Tx) or by (ii) the LNAs 1060(Rx) and the receive phase network 1050(Rx) to be calibrated and tuned to meet the system requirements. The RBU 1011 controls the phase shifts applied by the phase shifters in the controllable phase networks 1050(Tx) and 1050(Rx), where each phase shift can be individually selected to be anywhere between 0 degrees and 360 degrees. Note that any of the other communication nodes described in this specification can also be configured with analogous controllable transmit and/or receive phase networks to reduce any differences in the phase shifts applied by the PAs and LNAs (or for phase-shift errors occurring anywhere else along the transmit and/or receive paths). Although the controllable phase networks 1050(Tx) and 1050(Rx) address phase differences between the different PAs and LNAs, but not amplitude differences, those skilled in the art will understand that additional techniques, such as programmable attenuators, may be employed to control gain, if needed.

The calibration unit 1090 is provided to support the calibration and tuning of the controllable transmit and receive phase networks 1050(Tx) and 1050(Rx). As shown in FIG. 10, the calibration unit 1090 has (i) a transmit calibration section 1092 that tunes the controllable transmit phase network 1050(Tx) and (ii) a receive calibration section 1096 that tunes the controllable receive phase network 1050(Rx).

For transmit calibration processing, the transmit calibration section 1092 has a 1:8 switch 1093 that receives the eight signals TCP-1 to TCP-8 that are tapped by the eight transmit couplers 1070(Tx) and selects one of those tapped signals for calibration processing as controlled by the RBU 1011. An output signal 1094 from the transmit calibration section 1092 is applied to the RFEM 1015(Rx) in the receive path of the transceiver 1000. The following is an example of the transmit calibration processing:

1. The RBU 1011 sets equaled phase to all eight controllable phase shifters in the controllable transmit phase network 1050(Tx);

2. The RBU 1011 selects one of the eight input ports to the transmit Butler matrix 1040(Tx) using the four transmit switches 1023(Tx);
3. The RBU 1011 sends an outgoing signal via the TFEM 1015(Tx) to the selected input port of the transmit Butler matrix 1040(Tx);
4. All PAs 1060(Tx) receive the same RF signal with a particular phase progression defined by the selected input port of the transmit Butler matrix 1040(Tx);
5. The tapped RF signals TCP-1 to TCP-8 from the transmit couplers 1070(Tx) at the outputs of the PAs 1060(Tx) are fed to the eight input ports of the switch 1093 in the transmit calibration section 1092 of the calibration unit 1090;
6. The RBU 1011 sequentially selects each of the eight ports of the switch 1093 and the transmit calibration section 1092 sequentially sends each selected RF signal 1094 to the RFEM 1015(Rx), which down-converts and sends a corresponding baseband signal to the RBU 1011 for comparing to predefined phase values for the transmit phase network 1050(TX); and
7. The RBU 1011 sends appropriate phase corrections to the controllable phase shifters in the transmit phase network 1050(TX) to achieve the particular phase progression required for the selected beam.

For receive calibration, the receive calibration section 1096 receives an RF signal 1098 from the TFEM 1015(Tx) in the transmit path of the transceiver 1000. The receive calibration section 1096 has a 1:8 switch 1097 that transmits an RF signal (one of RCP-1 to RCP-8) to one of the receive couplers 1070(Rx) based on the configuration of the switch 1097 as controlled by the RBU 1011. The following is an example of the receive calibration processing:

1. The RBU 1011 sets equaled phase to all eight controllable phase shifters in controllable receive phase network 1050(Rx);
2. The RBU 1011 controls the switches 1023(Rx) to select one of the eight Rx signals from the receive phase network 1030(Rx);
3. The RBU 1011 sends the RF signal 1098 via the TFEM 1015(Tx) to the common port of the switch 1097 in the receive calibration section 1096 of the calibration unit 1090;
4. Under control by the RBU 1011, the RF signal 1098 is sequentially fed as one of the RF signals RCP-1 to RCP-8 to a receive coupler 1070(Rx) at the input port of the corresponding LNA 1060(Rx) for routing through the receive Butler matrix 1040(Rx);
5. Each selected incoming RF signal is sent to the RFEM 1015(Rx), which down-converts and sends a corresponding baseband signal to the RBU 1011 for comparing to predefined phase values for the receive phase network 1050(Rx); and
6. The RBU 1011 sends appropriate phase corrections to the controllable phase shifters in the receive phase network 1050(Rx) to achieve the particular phase progression required for the selected beam.

Figure 11:
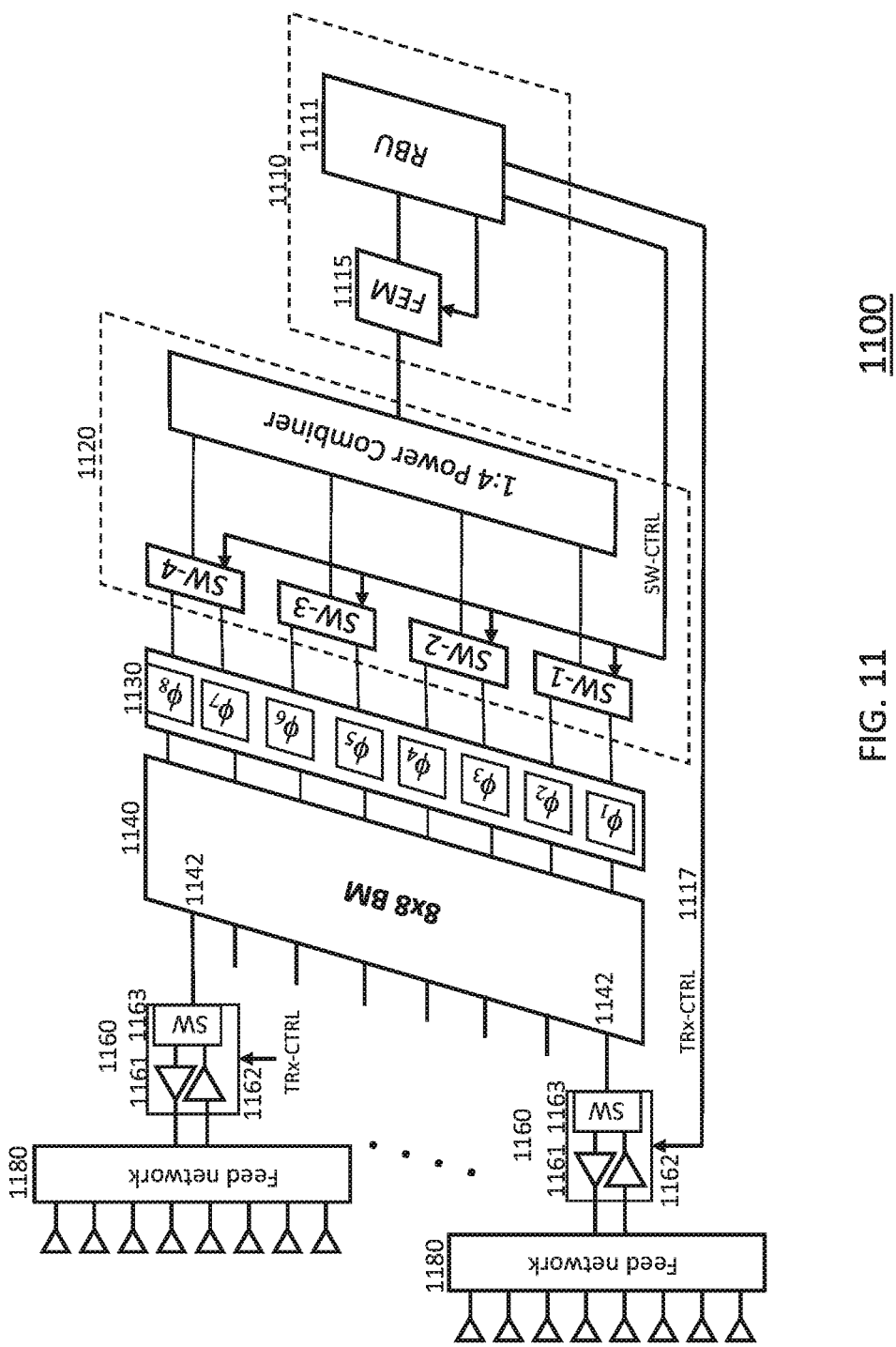
FIG. 11 is a schematic block diagram of another example of a transceiver of the present disclosure.

FIG. 11 is a schematic block diagram of an example of another transceiver 1100 of the present disclosure. The transceiver 1100 is substantially a combination of the transmitter 200 of FIG. 2 and the receiver 300 of FIG. 3 with a single controller 1110, a single switch network 1120, a single phase network 1130, a single Butler matrix 1140, and a single antenna array formed from the eight feed networks 1180 used in a time-division manner to support both transmit and receive operations for the same or different beampatterns. Note that, in the controller 1110, the RBU 1111 and the FEM 1115 are able to support both transmit and receive operations. This configuration can be used for Time Division Duplex (TDD) operation.

As shown in FIG. 11, the PA 1161 and LNA 1162 for each feed network 1180 are part of a gain module 1160 that also includes a 1:2 switch 1163 that is controlled by a transceiver-control signal 1117 from the RBU 1111. When the transceiver 1100 is configured for transmit operations, the switch 1163 is configured to connect the corresponding antenna port 1142 of the Butler matrix 1140 to the PA 1161. When the transceiver 1100 is configured for receive operations, the switch 1163 is configured to connect the LNA 1162 to the corresponding antenna port 1142 of the Butler matrix 1140, and the PA 1161 is disabled. Note that the feed networks 1180 are dual-polarity feed networks. Otherwise, the transmit operations of transceiver 1100 are analogous to the transmit operations of the transmitter 200 of FIG. 2 and the receive operations of transceiver 1100 are analogous to the receive operations of the receiver 300 of FIG. 3.

Figure 12:
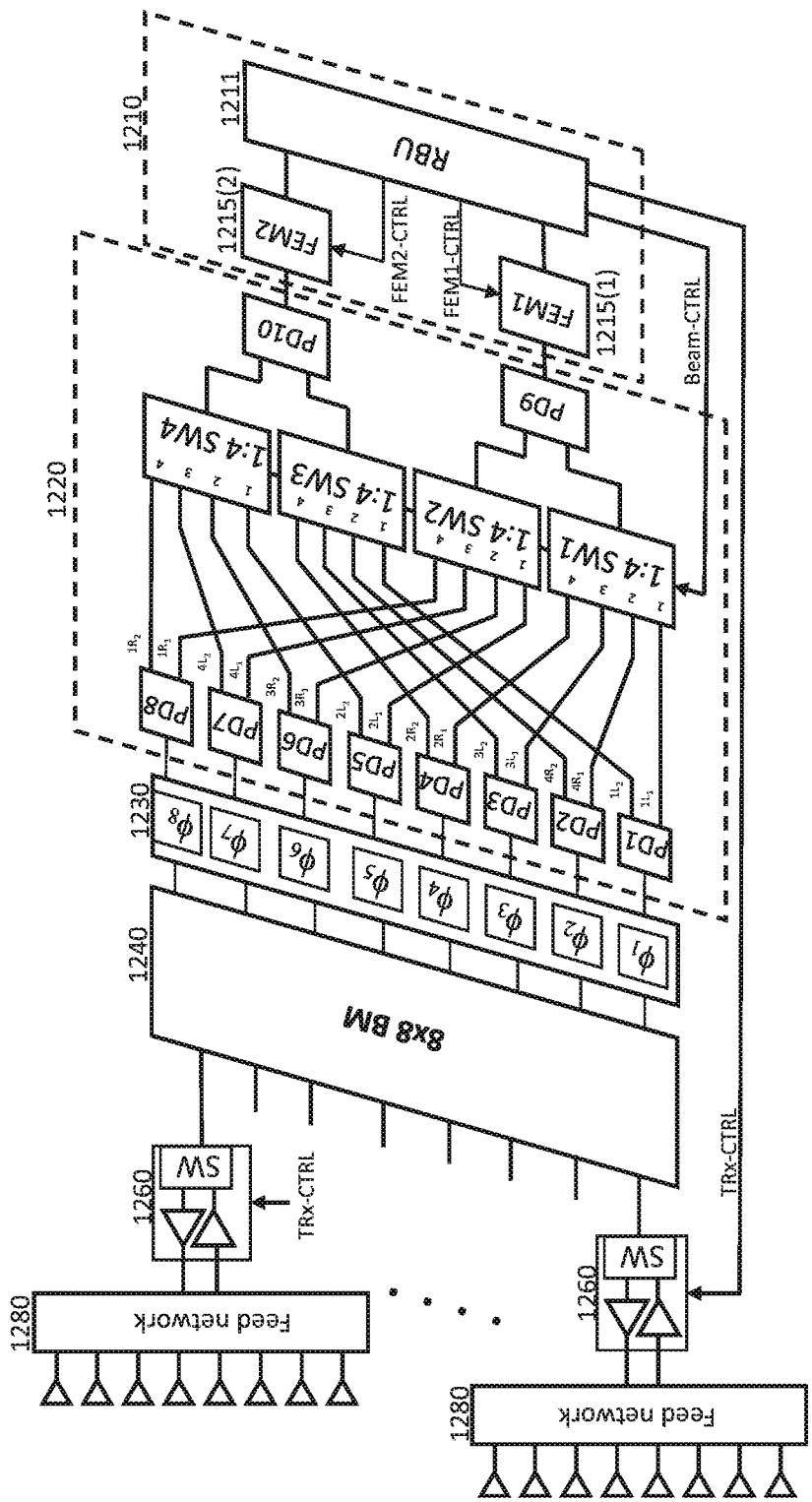
FIG. 12 is a schematic block diagram of a yet another example of a transceiver of the present disclosure.

FIG. 12 is a schematic block diagram of a yet another transceiver 1200 of the present disclosure. The transceiver 1200 is substantially a combination of the transmitter 600 of FIG. 6 and the receiver 700 of FIG. 7 with a single controller 1210, a single switch network 1220, a single phase network 1230, a single Butler matrix 1240, and a single antenna array formed from the feed networks 1280 used in a time-division manner to support both transmit and receive operations for the same or different pair of concurrent beampatterns. Note that, in the controller 1210, the RBU 1211 and the two FEMs 1215(1) and 1215(2) are able to support both transmit and receive operations. The transceiver 1200 also has gain modules 1260 that are analogous to the gain modules 1160 of the transceiver 1100 of FIG. 11. Otherwise, the transmit operations of transceiver 1200 are analogous to the transmit operations of the transmitter 600 of FIG. 6 and the receive operations of transceiver 1200 are analogous to the receive operations of the receiver 700 of FIG. 7.

Embodiments of the present invention may provide one or more of the following advantages:

- High power efficiency due to the novel spatial combining of the power amplifiers (PAs) and their close proximity to the antenna elements;
- Improved system noise factor (NF) due to the novel spatial combining of the low noise amplifiers (LNA) and the proximity of the LNAs to the antenna elements;
- Simple integrated phase and switch networks to/from the Butler matrix for pairing adjacent beams for generating combined beampatterns having low side-lobes;
- Efficient implementation of the beam-generation section of a communication node, which includes the PAs/LNAs, Butler matrices, phase networks, and switch networks, on a single printed circuit board (PCB);
- Improved beam and resolution with up to (2N−1) beam-patterns for the N beam positions of an (N×N) Butler matrix, which reduce beam-selection problems;
- Generation of low side-lobe beams without the need for complex weighs, making the invention well suited for high-capacity space-division multiple-access (SDMA) systems;
- Enhance system capacity due to support of multiple concurrent beams;
- Greatly reduced form factor, which makes the invention suitable for high-frequency applications;
- Simpler beam scanning control; and
- Low latency due to faster beam switching times with less downtime during beam switching.

Butler matrices for the disclosure can be designed using couplers and phase shifters in microstrip technology on a low-loss microwave substrate, such as an RO4350B laminate from Rogers Corporation of Chandler, Ariz., to produce orthogonal beams radiated from the antenna array. The desired beam is selected by the RBU through the switch-control signal based on beam activity detected at the RBU, without the need of programming complex weights.

Those skilled in the art will understand that a Butler matrix can be considered to be a generalization of quadrature hybrids consisting of multiple 90-degree hybrids and fixed phase shifters. A signal applied at any input port on one side of an (N×N) Butler matrix produces N signals at the N ports on the other side having equal amplitudes and a linear phase progression from port to port, where the phase increment depends on which input port is used.

Those skilled in the art will understand that Butler matrices are just one type of passive multibeamformer that can be used to implement the present invention. In general, suitable types of passive multibeamformers include, without limitation, those based on quasi-optics components known as reflectors, those based on lenses such as Rotman lenses, and beamforming circuits, which can be fully integrated with an antenna array into a single substrate, such as Butler matrices and Blass matrices.

Various modifications of the described embodiments, as well as other embodiments within the scope of the disclosure, which are apparent to persons skilled in the art to which the disclosure pertains are deemed to lie within the principle and scope of the disclosure, e.g., as expressed in the appended claims.

According to an example embodiment disclosed above in reference to FIGS. 2, 3, 6, 7, 10, 11, and 12, provided is a switched-beam communication node (200, 300, 600, 700, 1000, 1100, 1200) comprising an (N×M) antenna array having N antenna columns (280, 380), each antenna column having M antenna elements, where N is a positive integer power of 2 and M is a positive integer; an (N×N) passive multibeamformer (240, 340) having N antenna ports (242, 342) and N beam ports (241, 341), where each antenna port is connected to a different antenna column of the antenna array; a phase network (230, 330) having N phase shifters (231, 331), each phase shifter connected to a different beam port of the passive multibeamformer; a switch network (220, 320) configured to select one or two of the phase shifters in the phase network; and a controller (210, 310) configured to control the selection of the switch network such that (i) the controller can configure the node to support any one of N main beampatterns of the antenna array by controlling the switch network to select a corresponding single phase shifter of the phase network; and (ii) the controller can configure the node to support any one of up to at least (N−1) combined beampatterns of the antenna array by controlling the switch network to select a corresponding pair of phase shifters of the phase network.

In some embodiments of the above node, the passive multibeamformer is a Butler matrix.

In some embodiments of the above node, the phase network has N fixed phase shifters (231, 331).

In some embodiments of the above node, the switch network comprises a N/2 1:2 switches (223, 321) and 1:N/2 power unit (221, 323); each switch is connected (i) to a different pair of the phase shifters in the phase network, (ii) to the power unit, and (iii) to receive a switch control signal (213, 313) from the controller; the power unit is connected to the switches and to the controller; and the controller uses the switch control signal to selectively configure each switch (i) to connect the power unit to one of the two corresponding phase shifters or (ii) to connect the power unit to neither of the two corresponding phase shifters.

In some embodiments of the above node, the controller comprises a radio baseband unit (RBU) (211, 311) connected to apply a switch-control signal (213, 313) to the switch network; and a front-end module (FEM) (215, 315) connected (i) between the RBU and the switch network and (ii) to receive an FEM-control signal (212, 312) from the RBU.

In some embodiments of the above node, the node comprises a transmitter (200); the FEM is a transmitter FEM (TFEM) (215); the RBU (211) is configured to generate and transmit a digital baseband transmit (Tx) signal (214) to the TFEM; and the FEM is configured to convert the digital baseband Tx signal into an analog RF Tx signal (216) and transmit the Tx signal to the switch network (220).

In some embodiments of the above node, the node comprises a receiver (300); the FEM is a receiver FEM (RFEM) (315); the RFEM is configured to convert an analog RF receive (Rx) signal (324) received from the switch network (320) into a digital baseband Rx signal (314) and transmit the Rx signal to the RBU (311); and the RBU is configured to process the Rx signal.

In some embodiments of the above node, the node comprises a transmitter (200), and the controller (210) is configured to apply an analog RF Tx signal (216) to the switch network (220). If the controller has configured the node to support a main beampattern, then the switch network forwards the Tx signal to a corresponding single phase shifter (231) of the phase network (230); the single phase shifter shifts the Tx signal by its corresponding phase shift and presents a phase-shifted Tx signal (232) to a corresponding beam port (241) of the passive multibeamformer (240); and the passive multibeamformer (PM) phase-shifts, routes, and transmits the phase-shifted Tx signal as N PM-routed Tx signals (243) via its N antenna ports (242) to the N antenna columns (280) for wireless transmission from the antenna array. If the controller has configured the node to support a combined beampattern, then the switch network forwards the Tx signal to corresponding first and second phase shifters of the phase network; the first phase shifter shifts the Tx signal by its corresponding first phase shift and presents a first phase-shifted Tx signal (232) to a corresponding first beam port of the passive multibeamformer; the second phase shifter shifts the Tx signal by its corresponding second phase shift and presents a second phase-shifted Tx signal (232) to a corresponding second beam port of the passive multibeamformer; and the passive multibeamformer phase-shifts and routes the first and second phase-shifted Tx signals as N PM-routed TX signals (243) via its N antenna ports to the N antenna columns for wireless transmission from the antenna array.

In some embodiments of the above node, the node further comprises N power amplifiers (260), each power amplifier connected between a different antenna port of the passive multibeamformer and a corresponding antenna column, wherein the N power amplifiers are configured to provide N substantially identical phase shifts and N substantially identical gains.

In some embodiments of the above node, the node further comprises a controllable transmit phase network (1050(Tx)) having N controllable phase shifters connected to the N antenna ports of the passive multibeamformer (1040(Tx)) and N power amplifiers (1060(Tx)), each power amplifier connected between a different phase shifter of the transmit phase network and a corresponding antenna column (1080

(Tx)), wherein the transmit phase network and the N power amplifiers are configured to provide N substantially identical phase shifts and N substantially identical gains.

In some embodiments of the above node, the node further comprises a receiver (300).

In some embodiments of the above node, the receiver comprises another antenna array connected to another passive multibeamformer (340) connected to another phase network (330) connected to another switch network (320) connected to the controller and configured to process analog RF Rx signals (381).

In some embodiments of the above node, the node is a transceiver, wherein the antenna array, the passive multibeamformer, the phase network, the switch network, and the controller are configured to support both transmit and receive operations.

In some embodiments of the above node, the node further comprises N transceiver gain modules (1160, 1260), wherein each transceiver gain module is connected between a different antenna column (1180, 1280) of the antenna array and a corresponding antenna port (1142) of the passive multibeamformer (1140, 1240). Each transceiver gain module comprises a 1:2 switch (1163) connected to the corresponding antenna port of the passive multibeamformer; a power amplifier (PA) (1161) connected between the switch and the corresponding antenna column; and a low-noise amplifier (LNA) (1162) connected between the corresponding antenna column and the switch. Each transceiver gain module is connected to receive a control signal (1117) from the controller (1110) that controls whether the switch is configured to connect (i) the LNA to the corresponding antenna port of the passive multibeamformer or (ii) the corresponding antenna port of the passive multibeamformer to the PA.

In some embodiments of the above node, if the switch is configured to connect the LNA to the corresponding antenna port of the passive multibeamformer, then the PA is disabled by the control signal.

In some embodiments of the above node, the node comprises a receiver (300); the passive multibeamformer (340) is configured to (i) receive N analog RF receive (Rx) signals (361) at its N antenna ports (342) from the N antenna columns (380) of the antenna array and (ii) phase shift, route, and transmit the N Rx signals as N PM-routed Rx signals (343) to the N phase shifters (331) of the phase network (330); and each phase shifter of the phase network is configured to phase shift its corresponding PM-routed Rx signal and transmit a corresponding phase-shifted Rx signal (332) to the switch network (320). If the controller has configured the node to support a main beampattern, then the switch network transmits only one of the phase-shifted Rx signals as an Rx signal (324) to the controller (310). If the controller (310) has configured the node to support a combined beampattern, then the switch network combines two of the phase-shifted Rx signals into a combined Rx signal (324) and transmits the combined Rx signal to the controller (310).

In some embodiments of the above node, the node further comprises N low-noise amplifiers (LNAs) (360), each LNA connected between a different antenna column (380) of the antenna array and a corresponding antenna port (342) of the passive multibeamformer (340), wherein the N LNAs provide N substantially identical phase shifts and N substantially identical gains.

In some embodiments of the above node, the node further comprises N low-noise amplifiers (LNAs) (1060(Rx)), each LNA connected to a different antenna column (1080(Rx)) of the antenna array; and a controllable receive phase network (1050(Rx)) having N controllable phase shifters, each phase shifter connected between a different LNA and a corresponding antenna port of the passive multibeamformer (1040(Rx)), wherein the N LNAs and the receive phase network provide N substantially identical phase shifts and N substantially identical gains.

Note that, although the described combined beampatterns are formed by combining adjacent main beampatterns, it may be possible to generate additional combined beampatterns by combining two (or even more) main beampatterns that might not be adjacent to one another.

Although the invention has been described in the context of communication nodes having (8×8) antenna arrays, (8×8) Butler matrices, and 8-element phase networks that support eight main beampatterns and seven combined beampatterns, in general, communication nodes of the invention can be implemented with (N×M) antenna arrays, (N×N) Butler matrices, and N-element phase networks that support N main beampatterns and up to (N−1) combined beampatterns, where N is a positive integer power of 2 and M is a positive integer.

Although the abbreviation "RF" stands for radio frequency, as used in this specification, the term "RF" covers any suitable frequency of electromagnetic radiation for communication.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of terms such as "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. An apparatus comprising:
   an N×M antenna array having N antenna columns, each antenna column from the N antenna columns having M antenna elements, where N is a positive integer greater than or equal to 2 and M is a positive integer;
   an N×N passive multibeamformer having N antenna ports and N beam ports, where each antenna port is connected to a respective antenna column of the antenna array;
   a phase network having N phase shifters, each phase shifter connected to a respective beam port of the passive multibeamformer;
   a switch network configured to select one or two of the phase shifters in the phase network; and
   a controller configured to control the selection of the switch network such that:
      the controller can configure the apparatus to support any one of N main beampatterns of the antenna array by controlling the switch network to select a corresponding single phase shifter of the phase network; and
      the controller can configure the apparatus to support any one of up to at least N−1 combined beampatterns of the antenna array by controlling the switch network to select a corresponding pair of phase shifters of the phase network.

2. The apparatus of claim 1, wherein the passive multibeamformer is a Butler matrix.

3. The apparatus of claim 1, wherein the phase network has N fixed phase shifters.

4. The apparatus of claim 1, wherein:
   the switch network comprises a N/2 1:2 switches and 1:N/2 power unit;
   each switch from the N/2 1:2 switches is connected (i) to a respective pair of the phase shifters in the phase network, (ii) to the power unit, and (iii) to receive a switch control signal from the controller;
   the power unit is connected to the switches and to the controller; and
   the controller is configured to use the switch control signal to selectively configure each switch from the N/2 1:2 switches (i) to connect the power unit to one of the two corresponding phase shifters or (ii) to connect the power unit to neither of the two respective phase shifters.

5. The apparatus of claim 1, wherein the controller comprises:
   a radio baseband unit RBU connected to apply a switch-control signal to the switch network; and
   a front-end module FEM connected (i) between the RBU and the switch network and (ii) to receive an FEM-control signal from the RBU.

6. The apparatus of claim 5, wherein:
   the apparatus comprises a transmitter;
   the FEM is a transmitter FEM TFEM;
   the RBU is configured to generate and transmit a digital baseband transmit Tx signal to the TFEM; and
   the FEM is configured to convert the digital baseband Tx signal into an analog RF Tx signal and transmit the Tx signal to the switch network.

7. The apparatus of claim 5, wherein:
   the apparatus comprises a receiver;
   the FEM is a receiver FEM RFEM;
   the RFEM is configured to convert an analog RF receive Rx signal received from the switch network into a digital baseband Rx signal and transmit the Rx signal to the RBU; and
   the RBU is configured to process the Rx signal.

8. The apparatus of claim 1, wherein:
the apparatus comprises a transmitter;
the controller is configured to apply an analog RF Tx signal to the switch network;
in response to the apparatus being configured by the controller to support a main beampattern:
the switch network forwards the Tx signal to a corresponding single phase shifter of the phase network;
the single phase shifter shifts the Tx signal by its corresponding phase shift and presents a phase-shifted Tx signal to a corresponding beam port of the passive multibeamformer; and
the passive multibeamformer PM phase-shifts, routes, and transmits the phase-shifted Tx signal as N PM-routed Tx signals via its N antenna ports to the N antenna columns for wireless transmission from the antenna array; and
in response to the apparatus being configured by the controller to support a combined beampattern:
the switch network forwards the Tx signal to corresponding first and second phase shifters of the phase network;
the first phase shifter shifts the Tx signal by its corresponding first phase shift and presents a first phase-shifted Tx signal to a corresponding first beam port of the passive multibeamformer;
the second phase shifter shifts the Tx signal by its corresponding second phase shift and presents a second phase-shifted Tx signal to a corresponding second beam port of the passive multibeamformer; and
the passive multibeamformer phase-shifts and routes the first and second phase-shifted Tx signals as N PM-routed TX signals via its N antenna ports to the N antenna columns for wireless transmission from the antenna array.

9. The apparatus of claim 8, further comprising N power amplifiers, each power amplifier of the N power amplifiers connected between a respective antenna port of the passive multibeamformer and a corresponding antenna column, wherein the N power amplifiers are configured to provide N substantially identical phase shifts and N substantially identical gains.

10. The apparatus of claim 9, further comprising:
a controllable transmit phase network having N controllable phase shifters connected to the N antenna ports of the passive multibeamformer; and
N power amplifiers, each power amplifier of the N power amplifiers connected between a respective phase shifter of the transmit phase network and a corresponding antenna column, wherein the transmit phase network and the N power amplifiers are configured to provide N substantially identical phase shifts and N substantially identical gains.

11. The apparatus of claim 9, further comprising a receiver.

12. The apparatus of claim 11, wherein the receiver comprises another antenna array connected to another passive multibeamformer connected to another phase network connected to another switch network connected to the controller and configured to process analog RF Rx signals.

13. The apparatus of claim 11, wherein the apparatus comprises a transceiver, wherein the antenna array, the passive multibeamformer, the phase network, the switch network, and the controller are configured to support both transmit and receive operations.

14. The apparatus of claim 13, further comprising N transceiver gain modules, wherein:
each transceiver gain module of the N transceiver gain modules is connected between a respective antenna column of the antenna array and a corresponding antenna port of the passive multibeamformer;
each transceiver gain module of the N transceiver gain modules comprises:
a 1:2 switch connected to the corresponding antenna port of the passive multibeamformer;
a power amplifier PA connected between the switch and the corresponding antenna column; and
a low-noise amplifier LNA connected between the corresponding antenna column and the switch; and
each transceiver gain module of the N transceiver gain modules is connected to receive a control signal from the controller that controls whether the switch is configured to connect (i) the LNA to the corresponding antenna port of the passive multibeamformer or (ii) the corresponding antenna port of the passive multibeamformer to the PA.

15. The apparatus of claim 14, wherein, if the switch is configured to connect the LNA to the corresponding antenna port of the passive multibeamformer, the PA is disabled by the control signal.

16. The apparatus of claim 1, wherein:
the apparatus comprises a receiver;
the passive multibeamformer is configured to (i) receive N analog RF receive Rx signals at its N antenna ports from the N antenna columns of the antenna array and (ii) phase shift, route, and transmit the N Rx signals as N PM-routed Rx signals to the N phase shifters of the phase network;
each phase shifter of the phase network is configured to phase shift its corresponding PM-routed Rx signal and transmit a corresponding phase-shifted Rx signal to the switch network;
in response to the apparatus being configured by the controller to support a main beampattern, the switch network transmits only one of the phase-shifted Rx signals as an Rx signal to the controller; and
in response to the apparatus being configured by the controller to support a combined beampattern, the switch network combines two of the phase-shifted Rx signals into a combined Rx signal and transmits the combined Rx signal to the controller.

17. The apparatus of claim 16, further comprising N low-noise amplifiers LNAs, each LNA of the N LNAs connected between a respective antenna column of the antenna array and a corresponding antenna port of the passive multibeamformer, wherein the N LNAs provide N substantially identical phase shifts and N substantially identical gains.

18. The apparatus of claim 16, further comprising:
N low-noise amplifiers LNAs, each LNA of the N LNAs connected to a respective antenna column of the antenna array; and
a controllable receive phase network having N controllable phase shifters, each phase shifter connected between a respective LNA and a corresponding antenna port of the passive multibeamformer, wherein the N LNAs and the receive phase network provide N substantially identical phase shifts and N substantially identical gains.

19. The apparatus of claim 1, wherein the controller can configure the apparatus to support at least two concurrent beampatterns of the antenna array.

20. The apparatus of claim 1, wherein the apparatus is a switched-beam communication node.

21. The apparatus of claim 1, wherein N is a positive integer power of 2.

* * * * *